Patented Mar. 1, 1927.

1,619,357

UNITED STATES PATENT OFFICE.

CARL MARX, OF WYOMING, MILBURN TOWNSHIP, ESSEX COUNTY, NEW JERSEY, ASSIGNOR TO UNION SULPHUR COMPANY, A CORPORATION OF NEW JERSEY.

SULPHUR COMPOSITION OF DIMINISHED INFLAMMABILITY AND PROCESS FOR PRODUCING SAME.

No Drawing.   Application filed April 20, 1922.   Serial No. 555,708.

My invention has reference to an improved composition of matter containing sulphur and to articles made therefrom, one of the principal objects of my invention being the treatment of sulphur so as to diminish its burning qualities to the point where it is difficult of ignition and relatively uninflammable. Heretofore one of the principal drawbacks to the more extensive employment of sulphur in many branches of the technical arts where its solidity, moldability, plasticity and rigidity are valuable assests, has been the fact that sulphur is readily ignited, and in this condition evolves large amounts of sulphur dioxide of disagreeable and penetrating odor.

My researches were undertaken to endeavor to render sulphur substantially uninflammable, while at the same time conserving its valuable properties above referred to, and I have found that by the addition of certain haloid substituted hydrocarbons in amounts depending upon the measure of non-inflammability desired, it is possible to so reduce the power of ignition of the sulphur that a lighted match applied to the composition containing sulphur and haloid substituted hydrocarbon will not cause the mass to burn. While I have obtained satisfactory results with the bromide and iodine substituted hydrocarbons, I prefer to employ the chlorine compounds on account of their relatively lower cost. Of the chlorine substituted paraffin hydrocarbons, the chlorinated ethanes, and especially those ethanes of high chlorination as hexachlor-ethane, have been found satisfactory when manipulated according to my process. Of haloid substituted hydrocarbons, the chlorine substituted naphthalenes have given satisfaction in my work.

As an example of the embodiment of my invention employing a haloid substituted aliphatic hydrocarbon, I may take 100 parts of sulphur—either alone or containing admixed earthy, mineral or other binding or filling materials—adding thereto while the temperature is still above the melting point of sulphur, from 10 to 25 parts of hexa- chlorethane, care being exercised not to overheat the composition on account of loss of hexachlorethane by volatilization. The mass is then stirred until solidification has taken place, when it will be found that the material is distinctly uninflammable relative to the same mass without addition of haloid substituted hydrocarbon thereto. Where the mixture contains little other than sulphur in its composition, the hexachlorethane may be homogeneously incorporated directly in the liquefied sulphur.

As an example of the use of haloid substituted aromatic hydrocarbons, I have obtained satisfactory results in the reduction of inflammability by the use of chlorine substituted naphthalenes such as tri- and tetra-substituted naphthalenes, where these derivatives are solids with a range of melting points around that of sulphur. In the use of the chlorinated aromatic hydrocarbons I proceed in a manner similar to that when using the chlorinated aliphatic hydrocarbons, varying the process depending upon the physical constants of the haloid substituted hydrocarbon used. In any case, the proportion of substituted hydrocarbon to sulphur will vary with the degree or measure of inflammability it is desired to impart, and the number, nature and proportion of other ingredients present in the composition.

While it is possible to diminish the inflammability of sulphur by incorporation therewith of certain liquid chlorine substituted hydrocarbons as tetrachlorethane, pentachlorethane, monochlorbenzol, dichlorbenzol, trichlorbenzol, monochlortoluol, and monochlorxylol, in general, I have obtained better results by the employment of the solid haloid substituted hydrocarbons as above mentioned.

Having now described my invention and in what manner it may be carried into effect, what I claim as new and desire to secure by Letters Patent is:—

1. A mass of relatively non-inflammability composed of a mixture of 100 parts of sulphur, and 10 to 25 parts of commercial hexachlorethane.

2. A non-inflammable composition comprising sulphur as a principal ingredient, the sulphur being homogeneously mixed with at least 10 per cent of its weight of a non-inflammable haloid substituted hydrocarbon.

3. A non-inflammable composition comprising sulphur as a principal ingredient, the sulphur being homogeneously mixed with at least 10 per cent of its weight of a non-inflammable chlorinated hydrocarbon of the paraffin series.

4. A sulphur compound consisting of sulphur one hundred parts, hexachlorethane ten to twenty-five parts, and admixed filling materials.

5. A sulphur compound consisting of sulphur one hundred parts, non inflammable haloid substituted hydrocarbons ten to twenty-five parts, and admixed filling materials.

6. A sulphur compound consisting of sulphur one hundred parts, non-inflammable chlorinated hydrocarbon ten to twenty-five parts, and admixed filling materials.

7. A sulphur compound consisting of sulphur one hundred parts, non-inflammable chlorinated hydrocarbon of the paraffin series ten to twenty-five parts, and admixed filling materials.

In witness whereof, I have signed this specification this fifteenth day of April, 1922.

CARL MARX.